(12) United States Patent
Zhu

(10) Patent No.: US 10,435,055 B1
(45) Date of Patent: Oct. 8, 2019

(54) COLLAPSIBLE CART

(71) Applicant: Shou Qiang Zhu, Ontario, CA (US)

(72) Inventor: Shou Qiang Zhu, Ontario, CA (US)

(73) Assignee: Maxton Engineering Ltd, Hong Kong (HK)

( * ) Notice: Subject to any disclaimer, the term of this patent is extended or adjusted under 35 U.S.C. 154(b) by 0 days.

(21) Appl. No.: 16/045,694

(22) Filed: Jul. 25, 2018

Related U.S. Application Data

(60) Provisional application No. 62/536,787, filed on Jul. 25, 2017, provisional application No. 62/585,470, filed on Nov. 13, 2017.

(51) Int. Cl.
*B62B 3/02* (2006.01)

(52) U.S. Cl.
CPC .......... *B62B 3/025* (2013.01); *B62B 2205/06* (2013.01)

(58) Field of Classification Search
CPC ....... B62B 5/06; B62B 3/04; B62B 2202/404; B62B 3/022
See application file for complete search history.

(56) References Cited

U.S. PATENT DOCUMENTS

| | | | |
|---|---|---|---|
| 6,491,318 B1* | 12/2002 | Galt .......................... | B62B 3/02 280/42 |
| D748,739 S * | 2/2016 | Horowitz ..................... | D21/425 |
| 9,937,946 B1* | 4/2018 | Gillis ........................ | B62B 9/12 |
| 9,950,727 B1* | 4/2018 | Pang ........................ | B62B 3/001 |
| 2003/0025301 A1* | 2/2003 | Banuelos, III .......... | B62B 3/007 280/651 |
| 2008/0217886 A1* | 9/2008 | Poppinga .................. | B62B 3/02 280/651 |
| 2011/0204598 A1* | 8/2011 | Stevenson ................. | B62B 3/02 280/639 |

* cited by examiner

*Primary Examiner* — James A Shriver, II
*Assistant Examiner* — James J Triggs
(74) *Attorney, Agent, or Firm* — Che-Yang Chen; Law Offices of Scott Warmuth

(57) ABSTRACT

A collapsible cart may include a handle, a first supporting frame, and a second supporting frame. In one embodiment, the handle is movably secured at the first supporting frame, and the first supporting frame and the second supporting frame are connected with a connecting member. The connecting member may include a plurality of connecting units. In one embodiment, the collapsible cart further includes a fabric secured at a receiving space created by the supporting frames and the connecting members on both sides. It is important to note that when the cart is fully unfolded, the first and second connecting units are substantially perpendicular to the second supporting frame and the first supporting frame respectively to strengthen the connecting member.

13 Claims, 17 Drawing Sheets

COLLAPSIBLE CART

CROSS-REFERENCE TO RELATED APPLICATIONS

This application claims priority under 35 U.S.C. § 119 (e) to U.S. Provisional Patent Application Ser. No. 62/536,787, filed on Jul. 25, 2017; and U.S. Provisional Patent Application Ser. No. 62/585,470, filed on Nov. 13, 2017, the entire contents of which are hereby incorporated by reference.

FIELD OF THE INVENTION

The present invention is directed to a collapsible and portable cart, and in particular to a collapsible cart that can be used to store and transported various items, and the size of the cart can be easily minimized when not in use.

BACKGROUND OF THE INVENTION

In recent years, more and more people love outdoor and recreational activities such as camping, field trips, or Bar-B-Q during their free time because many people may endure high pressure at work, and have accumulated a lot of tension and stress. Not only can these outdoor activities help people release the stress, but also improve quality of life. When people enjoy their outdoor activities, carts are primarily used for storing and transporting food, groceries and Bar-B-Q items, and even little child can be put therein.

Throughout the time, portable carts have been developed so the carts can be transported in a confined space (such as vehicle trunk), and quickly converted into a three-dimensional space supported by wheels to store and transport a plurality of items when arriving the outdoor destination such as parks, camping site, beaches, etc. U.S. Pat. No. 5,738,365 to McCarthy discloses a collapsible cart including a base member, first and second double L-shaped brackets, a pair of locking pins, and two locking bar members. The locking bar members and locking pins are utilized to lock the double L-shaped brackets into place when the cart is in the uncollapsed configuration.

U.S. Pat. No. 6,685,199 to Stravitz et al. discloses a collapsible frame which is readily folded up into a closed position having a narrow lateral profile and folded open back into the fully open position when needed. In the fully open position the cart will structurally support a storage container full of files or other items. No tools or other means are needed to fold up the cart into the folded position or to unfold the cart back into the fully open position.

However, the collapsible carts disclosed above may have too many conjugating points that would weaken the structure of the collapsible carts. It is also inconvenient for the user to engage/disengage every conjugating points when the user wants to use or store them. Therefore, there remains a need for a new and improved collapsible cart that is more convenient and efficient for the user to unfold or store without putting any additional or unnecessary burden on the users.

SUMMARY OF THE INVENTION

It is an object of the present invention to provide a collapsible cart that can be stored and moved more conveniently and efficiently without putting any additional or unnecessary burden on the users.

It is another object of the present invention to provide a collapsible cart, the size of which can be easily minimized so the user can easily transport the cart to any destination the user wants to go, and uses the cart in the destination, such as a camping spot, park, etc.

In one aspect, a collapsible cart may include a handle, a first supporting frame, and a second supporting frame. In one embodiment, the handle is movably secured at the first supporting frame, and the first supporting frame and the second supporting frame are connected with a connecting member. The connecting member may include a plurality of connecting units. The connecting member is used not only to connect the first and second supporting frames and, but also collapse the cart to a compact size, so it is convenient for the user to carry it out and store it in the garage or trunk. In one embodiment, the collapsible cart further includes a fabric secured at a receiving space created by the supporting frames and the connecting members on both sides. It is important to note that when the cart is fully unfolded, the first and second connecting units are substantially perpendicular to the second supporting frame and the first supporting frame respectively to strengthen the connecting member.

In an exemplary embodiment, one end of the first connecting unit is pivotally connected to the upper portion of the second supporting frame, and the other end there of is pivotally connected to one end of the fourth connecting unit. The other end of the fourth connecting unit is pivotally connected to the lower portion of the first supporting frame. Similarly, one end of the second connecting unit is pivotally connected to the upper portion of the first supporting frame, and the other end there of is pivotally connected to one end of the third connecting unit. The other end of the third connecting unit is pivotally connected to the lower portion of the first supporting frame. It is noted that the connecting member is located on both sides of the first and second supporting frames, and the third and fourth connecting unit are pivotally connected at nearly a center portion of the connecting member.

When the user finishes using the cart, the size of the cart can be significantly reduced to just occupy a minimum space. More particularly, the structure of the cart starts to collapse when the first supporting frame and the second supporting frame are squeezed toward the center portion of the cart. As discussed above, each of the first and second connecting units has one end pivotally connected to the second supporting frame and first supporting frame respectively, and has the other end pivotally connected to the fourth and third connecting unit respectively, so when the first supporting frame and second supporting frame are being moved toward each other, the movement of the two supporting frames triggers the collapse of the connecting member to minimize the size of the cart.

In another embodiment of the present invention, the first and second supporting frames each extends taller, and a first level for supporting items is provided above the connecting members (e.g., to support a fabric container). In addition, a folding platform is provided below the receiving space defined between the connecting members, to provide a second level for supporting items on the folding platform.

BRIEF DESCRIPTION OF THE DRAWINGS

FIG. 6A is a side view of the wagon in its fully open configuration; FIG. 6B omits that container; FIG. 6C is a top view of the wagon without the container; FIGS. 6D and 6E are end views, showing the handle extended and retracted.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

As used in the description herein and throughout the claims that follow, the meaning of "a", "an", and "the" includes reference to the plural unless the context clearly dictates otherwise. Also, as used in the description herein and throughout the claims that follow, the terms "comprise or comprising", "include or including", "have or having", "contain or containing" and the like are to be understood to be open-ended, i.e., to mean including but not limited to. As used in the description herein and throughout the claims that follow, the meaning of "in" includes "in" and "on" unless the context clearly dictates otherwise.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the embodiments. As used herein, the term "and/or" includes any and all combinations of one or more of the associated listed items.

Figure 1:
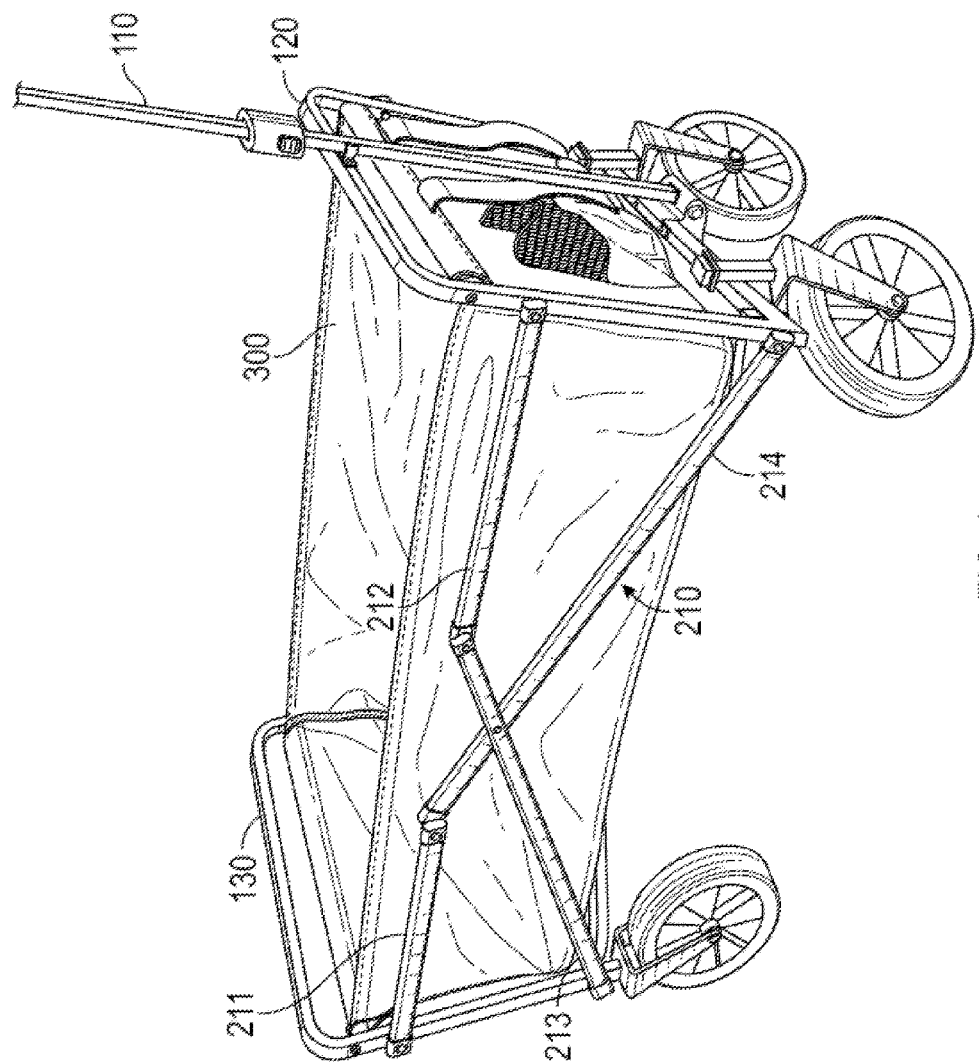
FIG. 1 illustrates a collapsible cart in a fully open status in the present invention.
Figure 2:
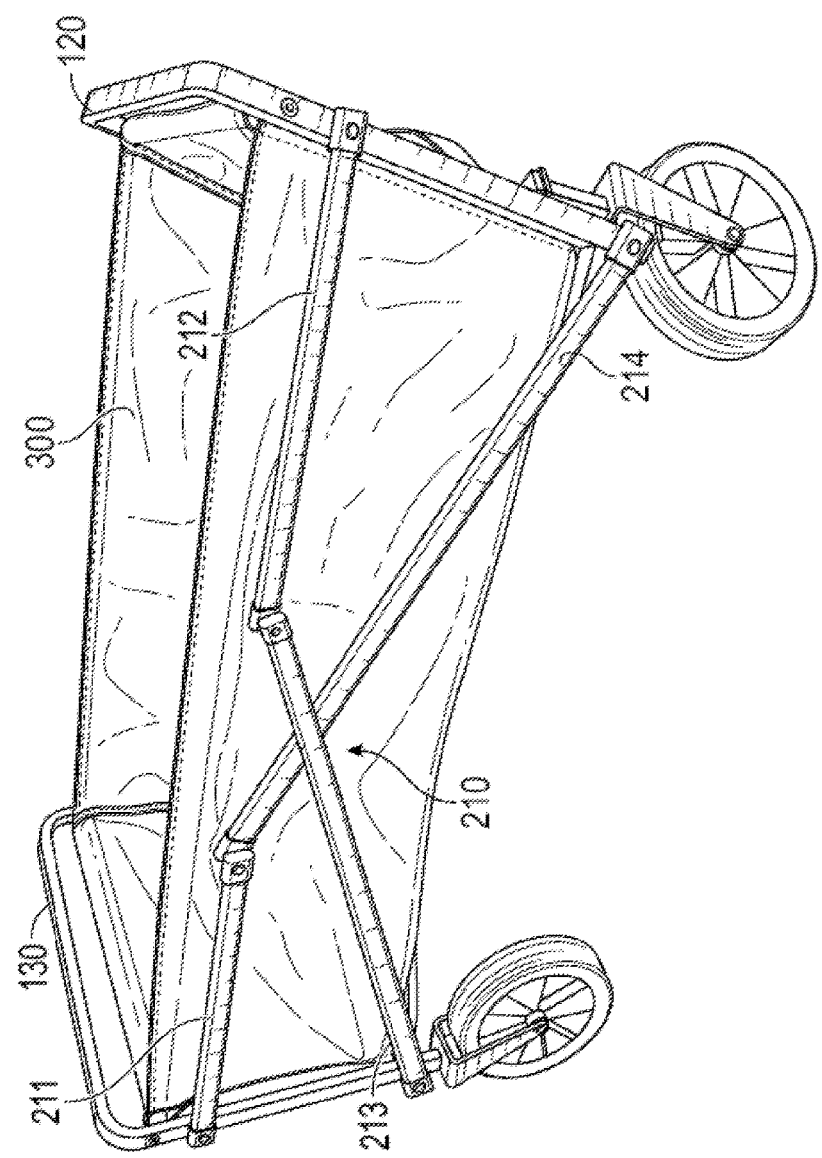
FIG. 2 illustrates the side frame of the collapsible cart in a fully open status in the present invention.
Figure 3:
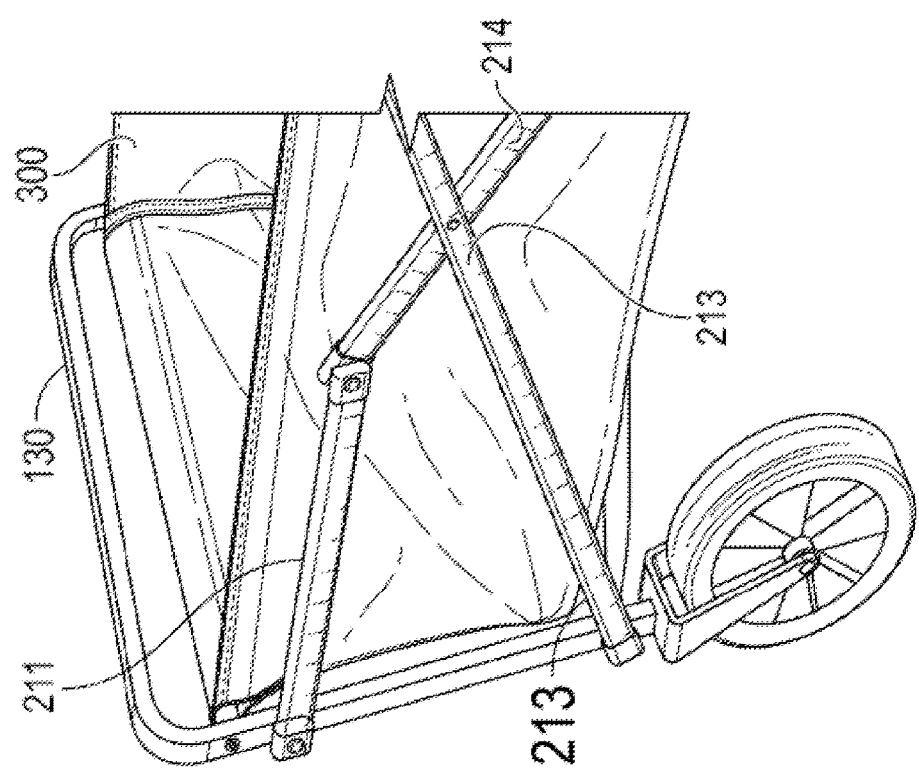
FIG. 3 illustrates the horizontal supporting unit of the side frame of the collapsible cart in a fully open status in the present invention.

In order to further understand the goal, characteristics and effect of the present invention, a number of embodiments along with the drawings are illustrated as following:

In one aspect, a collapsible cart may include a handle 110, a first supporting frame 120, and a second supporting frame 130. In one embodiment, the handle is movably secured at the first supporting frame 120, and the first supporting frame 120 and the second supporting frame 130 are connected with a connecting member 210, as shown in FIGS. 1 to 3. The connecting member 210 may include a plurality of connecting units (211, 212, 213, 214). The connecting member 210 is used not only to connect the first and second supporting frames 120 and 130, but also collapse the cart to a compact size, so it is convenient for the user to carry it out and store it in the garage or car trunk. In one embodiment, the collapsible cart further includes a fabric 300 (or a collapsible container made of a flexible material such as a fabric) secured at a receiving space created by the supporting frames (120, 130) and the connecting members 210 on both sides. It is important to note that when the cart is fully unfolded, the connecting units 211 and 212 are substantially perpendicular to the second supporting frame 130 and the first supporting frame 120 respectively (or substantially horizontal) to strengthen the connecting member 210 in the unfolded configuration.

In an exemplary embodiment, one end of the connecting unit 211 is pivotally connected to the upper portion of the second supporting frame 130, and the other end there of is pivotally connected to one end of the connecting unit 214. The other end of the connecting unit 214 is pivotally connected to the lower portion of the first supporting frame 120. Similarly, one end of the connecting unit 212 is pivotally connected to the upper portion of the first supporting frame 120, and the other end there of is pivotally connected to one end of the connecting unit 213. The other end of the connecting unit 213 is pivotally connected to the lower portion of the first supporting frame 130. It is noted that the connecting member 210 is located on both sides of the supporting frames 120 and 130, and the connecting unit 213 and 214 are pivotally connected at nearly a center portion (e.g., a symmetrical center) of the connecting member 210, and at a location away from the mid-point along the respective connecting units (213, 214), which location is further away from the pivotal connection at the lower portion of the respective first and second supporting frames (120, 130).

Figure 4:
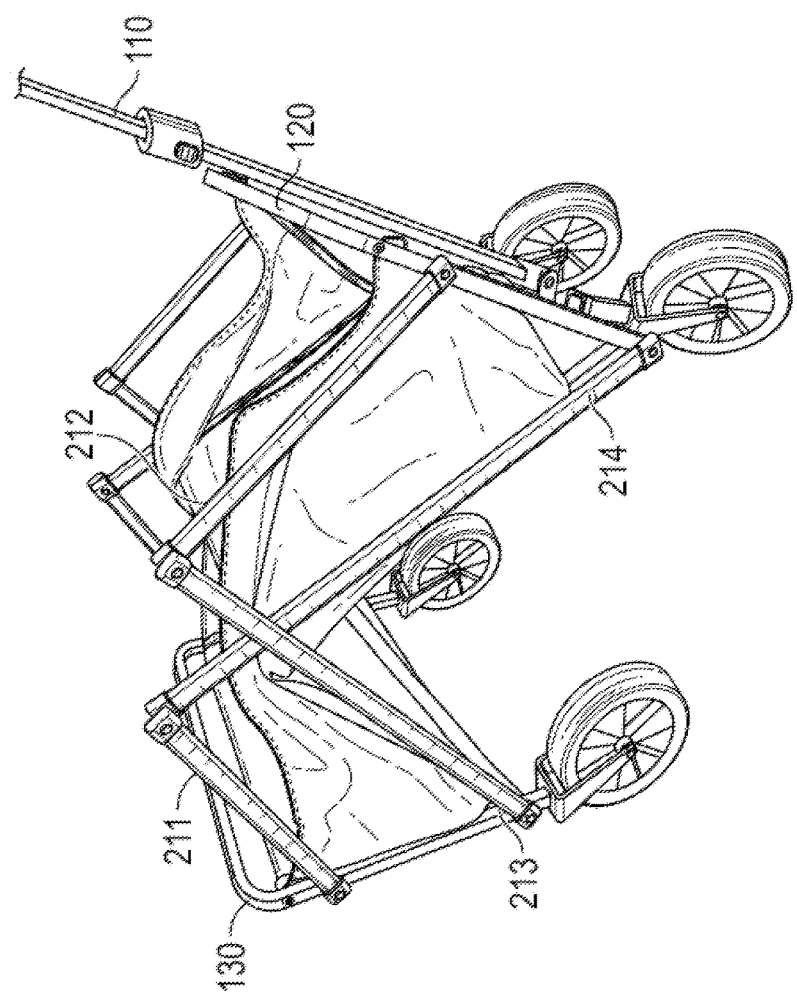
FIG. 4 illustrates the collapsible cart in the present invention that is folded to minimize its size.
Figure 5:
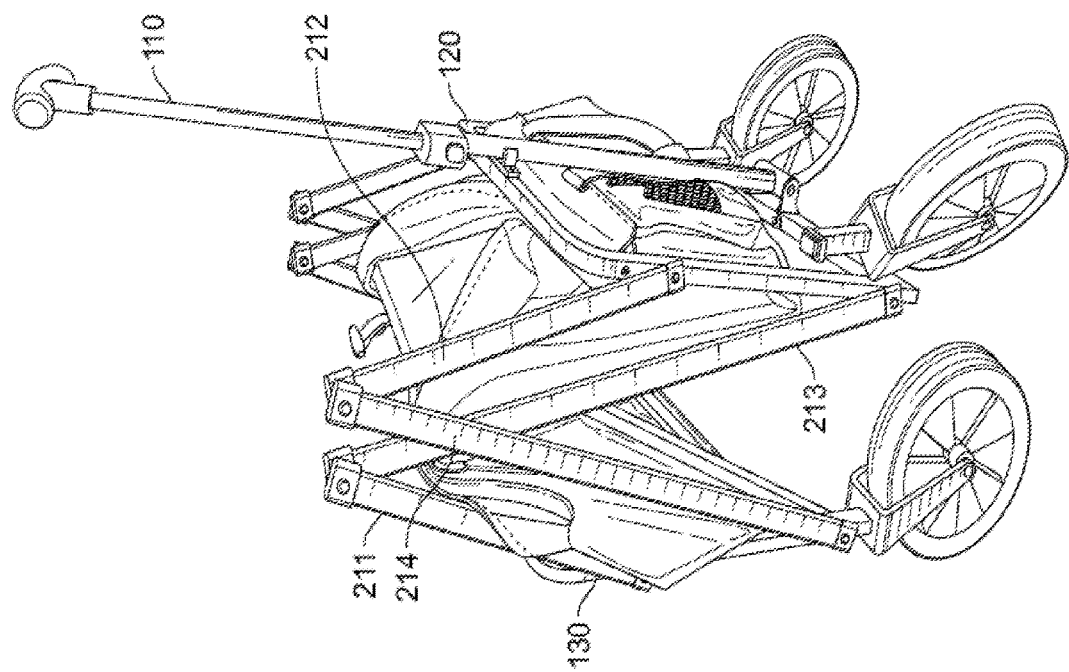
FIG. 5 illustrates the collapsible cart in the present invention with its most minimized size.

When the user finishes using the cart, the size of the cart can be significantly reduced to just occupy a minimum space. More particularly, the structure of the cart starts to collapse when the first supporting frame 120 and the second supporting frame 130 are squeezed toward the center portion of the cart, as shown in FIG. 4. As discussed above, each of the connecting units 211 and 212 has one end pivotally connected to the second supporting frame 130 and first supporting frame 120 respectively, and has the other end pivotally connected to the connecting unit 214 and 213 respectively, so when the first supporting frame 120 and second supporting frame 130 are being moved toward each other, the movement of the two supporting frames triggers the collapse of the connecting member 210 to minimize the size of the cart. The cart can be eventually minimized as shown in FIG. 5.

Essentially, as illustrated in the FIGS. 1-5, the connecting member 210 resembles a scissor hinge structure, which interconnects between the first supporting frame 120 and the second supporting frame 130. Accordingly, FIGS. 1-5 illustrate a collapsible wagon, comprising: a first supporting frame (120); a second supporting frame (130); and a pair of collapsible connecting members (210) pivotally connected to an upper portion and a lower portion of the respective first and second supporting frames (120, 130), wherein the pair of connecting members (210) can be configured between an extended configuration in which the first and second supporting frames (120, 130) are spaced apart and a receiving space is defined between the first and second supporting frames (120, 130) and the pair of connecting members (210), and a collapsed configuration in which the first supporting frame (120) is brought close to the second supporting frame (130) to collapse the receiving space, and wherein each connecting member (210) comprises a single scissor hinge structure pivotally interconnecting between the first and second supporting frames (120, 130). Furthermore, in the collapsible wagon as illustrated, the scissor hinge structure comprises a first connecting unit (214) and a second connecting unit (213), wherein the first and second connecting units (214, 213) are pivotally connected at a substantially pivotal center of the scissor hinge structure, wherein a first end of the first connecting unit (214) is pivotally connected to a lower portion of the first supporting frame (120), and a first end of the second connecting unit (213) is pivotally connected to a lower portion of the second supporting frame (130), and wherein the pivotal center is located away from the mid-point along the respective first and second connecting units (214, 213), and at a location further away from the pivotal connection to the lower portion of the respective first and second supporting frames (120, 130). Still further, in the collapsible wagon as illustrated, each connecting member (210) further comprises: a third connecting unit (212) having a first end pivotally connected to an upper portion above the lower portion of the first supporting frame (120), and a second end pivotally connected to a second end of the second connecting unit (213) above the pivotal center; and a fourth connecting unit (211) having a first end pivotally connected to an upper portion above the lower portion of the second supporting frame (130), and a second end pivotally connected to a second end of the first connecting unit (214) above the pivotal center. In addition, in the collapsible wagon as illustrated, the third connecting unit (212) and the fourth connecting unit (211) are substantially horizontal with the connecting member (210) in the extended configuration, and further wherein a collapsible container (300) made of a flexible material is provided in the receiving space in the extended configuration of the connecting members (210), and wherein the container (300) is collapsed as the receiving space is collapsed in the collapsed configuration of the connecting members (210).

In another embodiment of the present invention illustrated in FIGS. 6 and 7, the structure of the collapsible wagon is similar to the embodiment of FIGS. 1 to 5, except that the first and second supporting frames (120', 130') each extends taller, and a first level for supporting items is provided above similar connecting members 210 (e.g., to support a fabric container 300). In addition, a folding platform 301 is provided below the receiving space defined between the connecting members 210, to provide a second level for supporting items on the folding platform 301.

In this embodiment, the connection members 210 are similarly pivotally connected to a bottom or lower portion of the first and second supporting frames (120', 130'), but given the taller first and second supporting frames (120', 130'), the connection members 210 are connected to an upper portion above the lower portion, which is about the mid-section of the respective supporting frames (120', 130'). Cross-members 410 are provided to connect between the connecting members 210. Pivoting bracing members (310, 320) are provided on the sides to brace the remaining portions of the supporting frames (120', 130') above the mid-section or upper portion of the supporting frames (120', 130'), which defines a top space in the top level, which can receive, for example, a fabric container 300. The folding platform 301 that is provided below the receiving space defined between the connecting members 210 would provide a second level for supporting items on the folding platform 301.

Figure 6A:
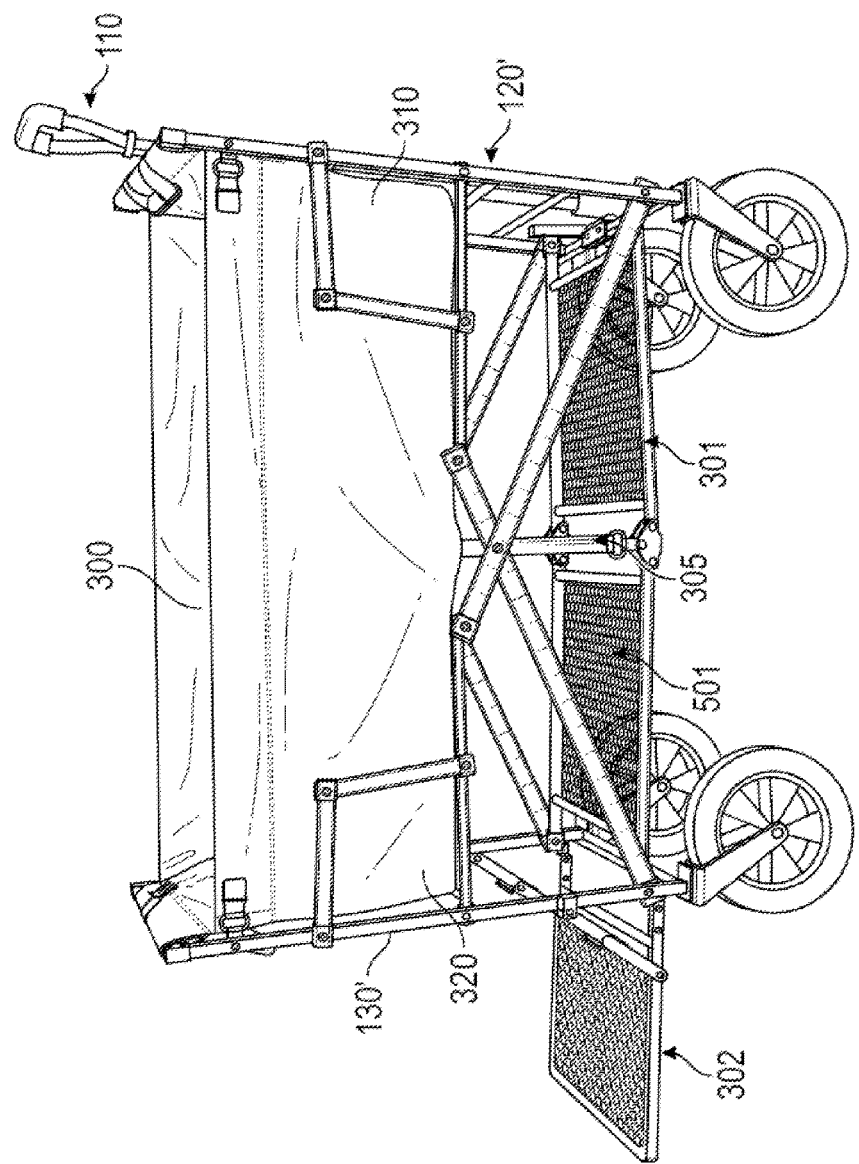
FIGS. 6A to 6E illustrate various views of a collapsible wagon in accordance with one embodiment of the present invention.
Figure 6B:
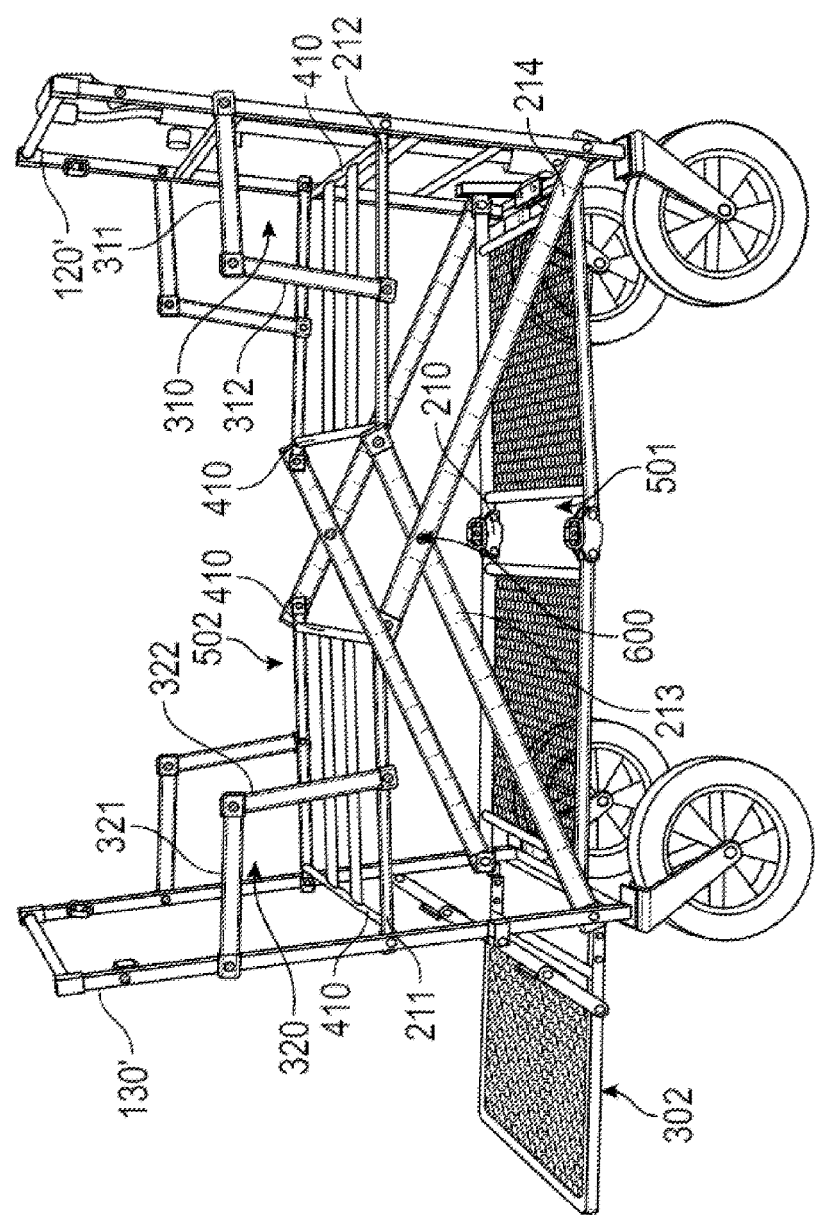
Figure 6C:
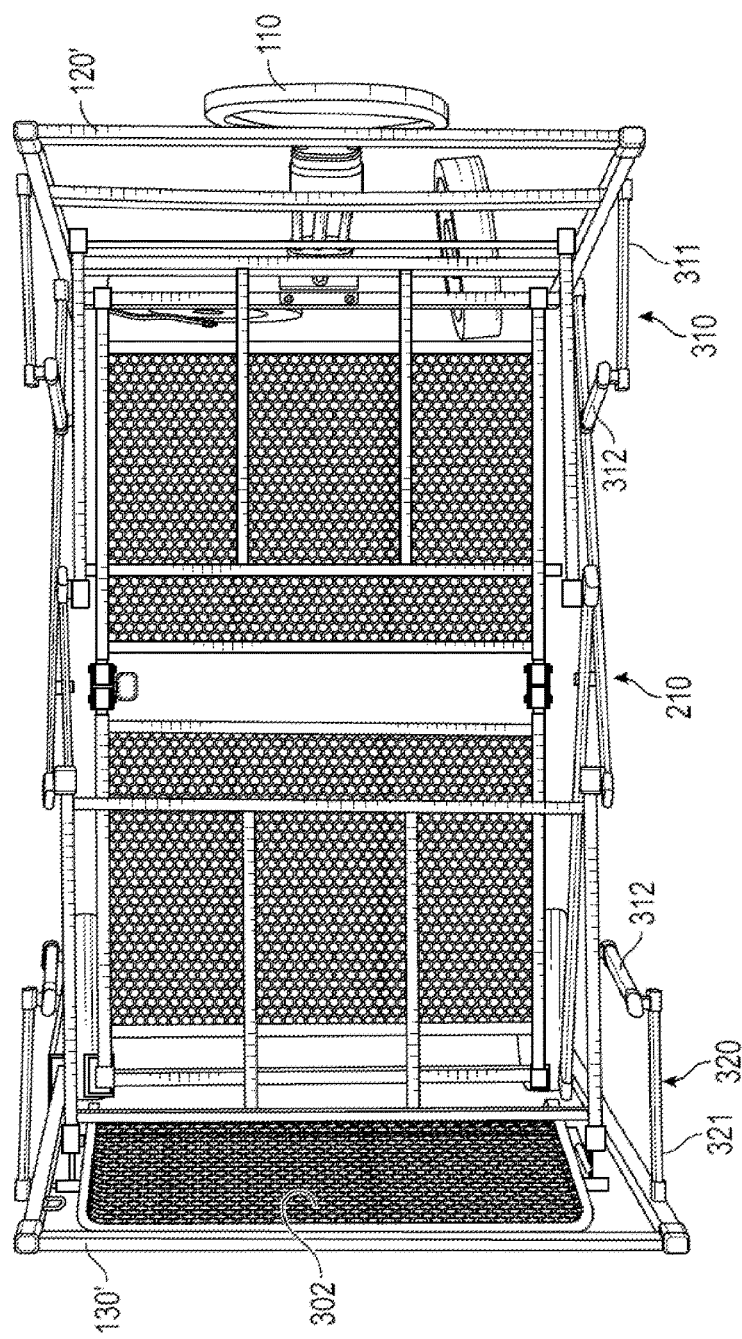
Figure 6D:
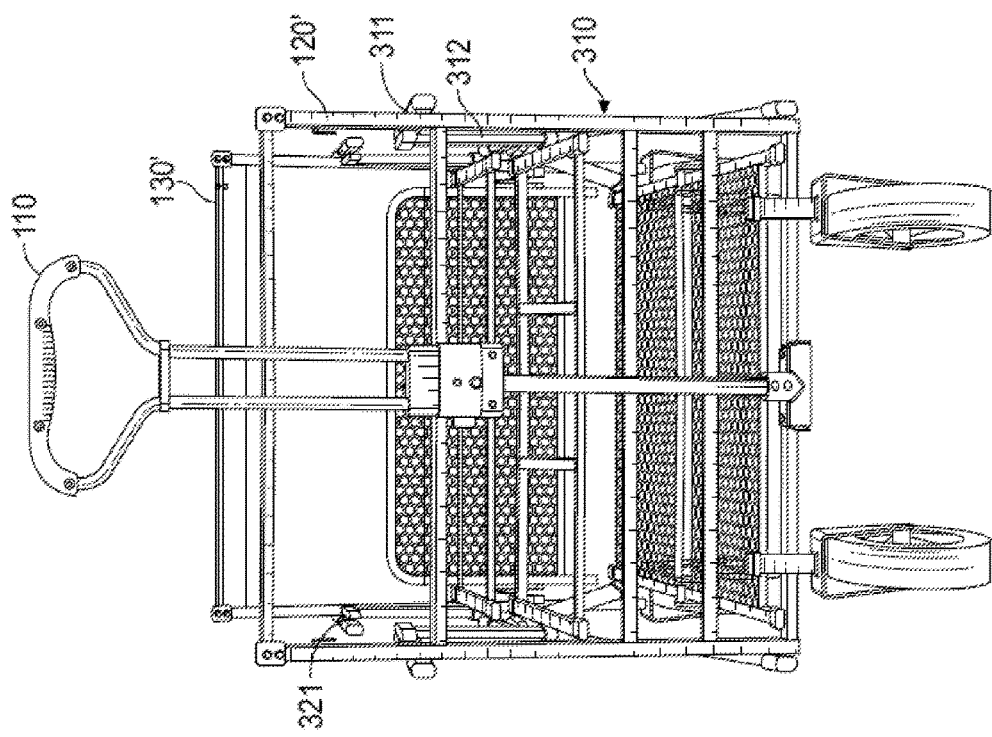
Figure 6E:
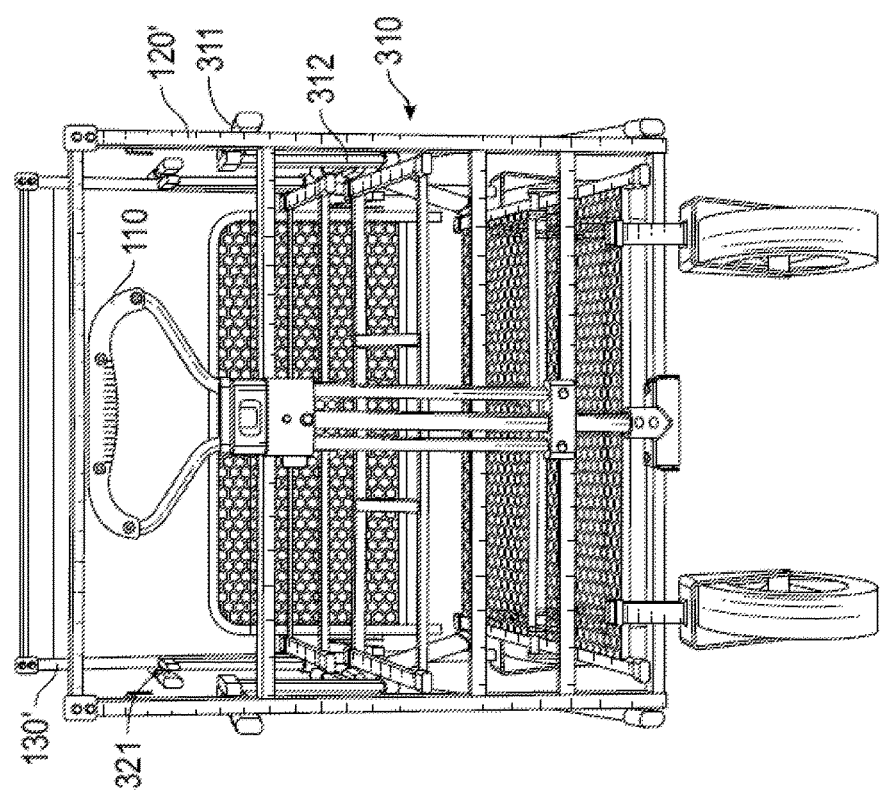

Specifically, referring to FIGS. 6A to 6E (the container 300 is omitted in FIGS. 6B to 6E to not obscure the structure of the wagon structure), the connecting member 210 resembles a scissor hinge structure, which interconnects between the first supporting frame 120' and the second supporting frame 130'. Accordingly, FIGS. 6A to E illustrate a collapsible wagon, comprising: a first supporting frame (120'); a second supporting frame (130'); and a pair of collapsible connecting members (210) pivotally connected to an upper portion and a lower portion of the respective first and second supporting frames (120', 130'), wherein the pair of connecting members (210) can be configured between an extended configuration in which the first and second supporting frames (120', 130') are spaced apart and a receiving space is defined between the first and second supporting frames (120', 130') and the pair of connecting members (210), and a collapsed configuration in which the first supporting frame (120') is brought close to the second supporting frame (130') to collapse the receiving space, and wherein each connecting member (210) comprises a single scissor hinge structure pivotally interconnecting between the first and second supporting frames (120', 130'). Further, in the collapsible wagon as illustrated, the scissor hinge structure comprises a first connecting unit (214) and a second connecting unit (213), wherein the first and second connecting units (214, 213) are pivotally connected at a substantially pivotal center of the scissor hinge structure, wherein a first end of the first connecting unit (214) is pivotally connected to a lower portion of the first supporting frame (120'), and a first end of the second connecting unit (213) is pivotally connected to a lower portion of the second supporting frame (130'), and wherein the pivotal center is located away from the mid-point along the respective first and second connecting units (214, 213), and at a location further away from the pivotal connection to the lower portion of the respective first and second supporting frames (120', 130'). Still further, in the collapsible wagon as illustrated, each connecting member (210) further comprises: a third connecting unit (212) having a first end pivotally connected to an upper portion above the lower portion of the first supporting frame (120'), and a second end pivotally connected to a second end of the second connecting unit (213) above the pivotal center; and a fourth connecting unit (211) having a first end pivotally connected to an upper portion above the lower portion of the second supporting frame (130'), and a second end pivotally connected to a second end of the first connecting unit (214) above the pivotal center. In addition, in the collapsible wagon as illustrated, the third connecting unit (212) and the fourth connecting unit (211) are substantially horizontal with the connecting member (210) in the extended configuration. FIG. 6D shows the retractable handle (110) in its extended configuration, as compared to the retracted configuration shown in FIG. 6E.

Further in this second embodiment, the collapsible wagon as illustrated further comprises a plurality of cross-members (410) connecting between the connection members (210) and above the receiving space (501), so as to reinforce and provide rigidity to the taller overall structure of the wagon. The cross-members also provide a platform to support the container 300. The collapsible wagon as illustrated further comprises, on each side of the wagon, a first bracing member (310) pivotally connected to the third connecting unit (212) and the first supporting frame (120'), and a second bracing member (320) pivotally connected to the fourth connecting unit (211) and the second supporting frame (130'). The bracing members (310, 320) provide rigidity support to the supporting frames (120', 130'). In addition, in the collapsible wagon as illustrated, the first bracing member (310) comprises a fifth and sixth connecting units (311, 312), wherein a first end of the fifth connecting unit (311) is pivotally connected to the first end of the sixth connecting unit (312), and wherein a second end of the fifth connecting unit (311) is pivotally connected to a top portion above the upper portion of the first supporting frame (120'), and a second end of the sixth connecting unit (312) is pivotally connected to along the third connecting unit (212), and the second bracing member (320) comprises a seventh and eighth connecting units (321, 322), wherein a first end of the seventh connecting unit (321) is pivotally connected to the first end of the eighth connecting unit (322), and wherein a second end of the seventh connecting unit (321) is pivotally connected to a top portion above the upper portion of the first supporting frame (120'), and a second end of the eighth connecting unit (322) is pivotally connected to along the fourth connecting unit (211). The pivoting braces facilitate collapsing/folding of the supporting frames (120', 130') with the connecting members 210. As illustrated, a top space (502) is defined above the cross-members (410) by the first and second bracing members and the first and second supporting frames (120', 130') in the extended configuration of the connecting members (210), wherein the top space (502) is collapsed in the collapsed configuration of the connecting members (210).

As further illustrated, similar to the previous embodiment, the collapsible wagon can be provided with a collapsible container (300) made of a flexible material. However, in this embodiment, the container (300) is provided in the top space (502) above the cross-members (410) and the receiving space (501) in the extended configuration of the connecting members (210), wherein the container (300) is collapsed as the top space (502) is collapsed in the collapsed configuration of the connecting members (210).

In the illustrated embodiment, the collapsible wagon further comprises a foldable platform (301) below the receiving space (501), wherein the foldable platform (301) is foldable along a hinge below the pivotal center (600) of the connecting member (210). The foldable platform provide rigidity to the wagon in the extended configuration of the connection members 210. In addition, an extended platform (302) may be optionally provided, which is pivotally supported at the lower portion of the second supporting frame (130'), to support additional items.

To facilitate opening the container (300) from a collapsed configuration, a flexible strap (305) is provided to anchor the bottom edge of the container (300) to the hinge of foldable platform (301) in the extended configuration of the connecting members 210.

Referring to FIGS. 7A to 7I, the sequence of folding/collapsing the wagon is illustrated. In some of the views, the container 300 is omitted to provide a clear view of the collapsing structure.

Figure 7A:
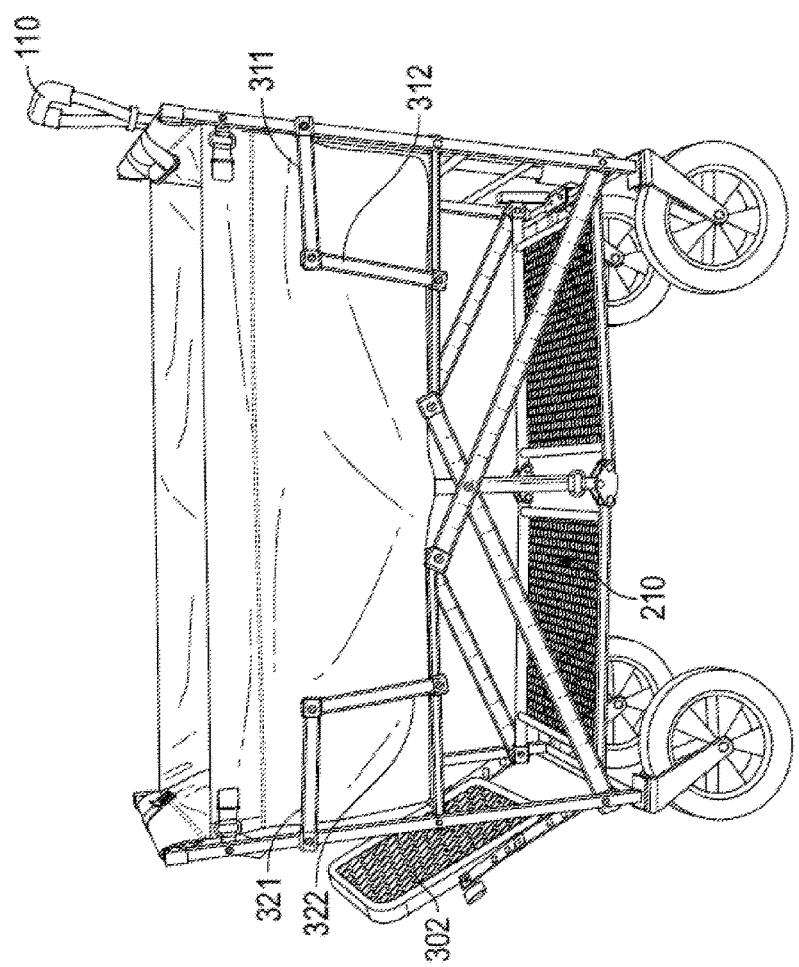
FIGS. 7A to 7H illustrate the sequence of folding the wagon of FIG. 6, from its maximum size (for carrying items) to its minimum size (for stowing/storage).
Figure 7B:
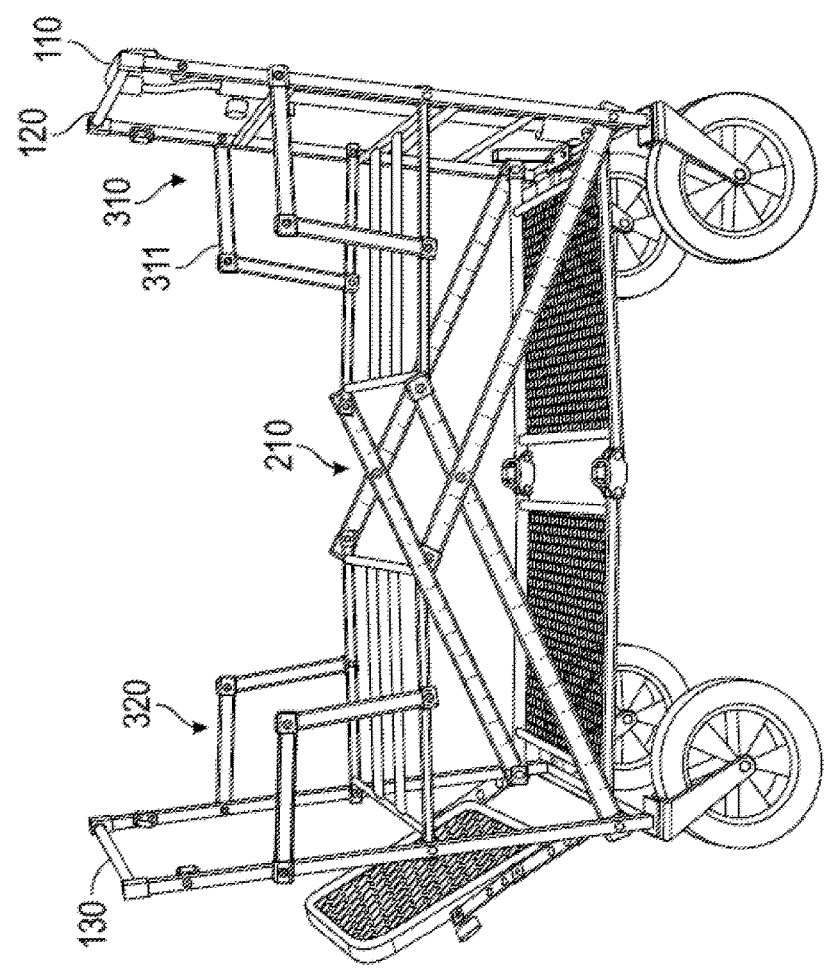
Figure 7C:
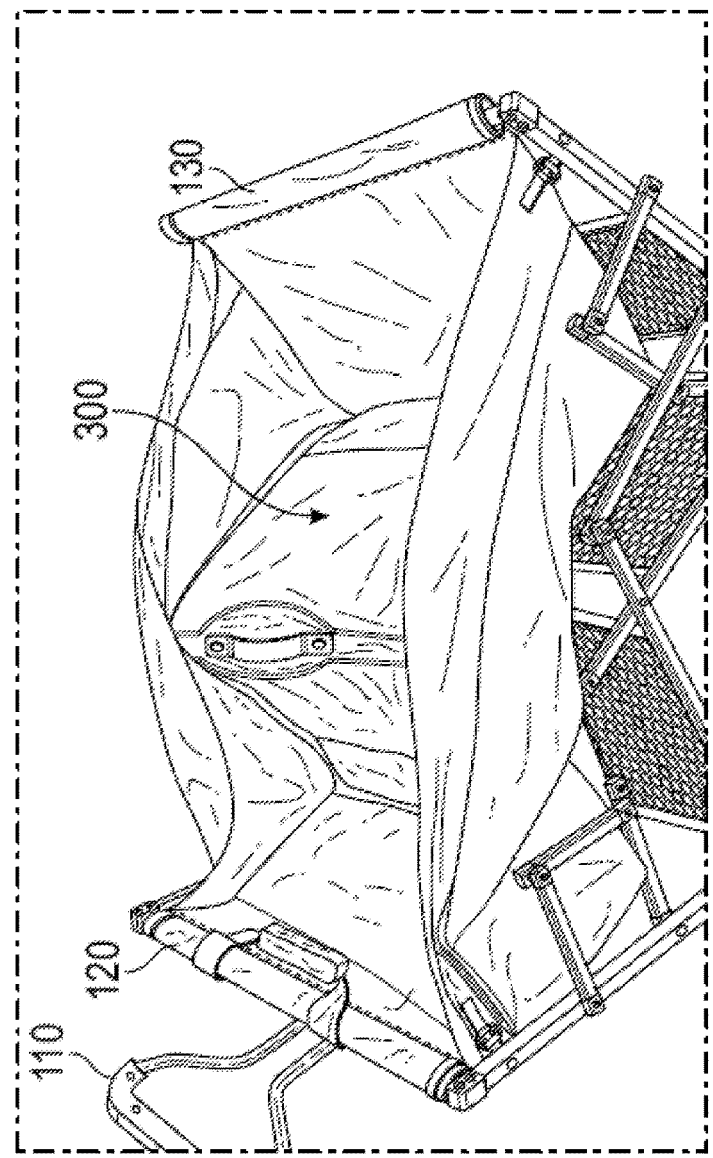
Figure 7D:
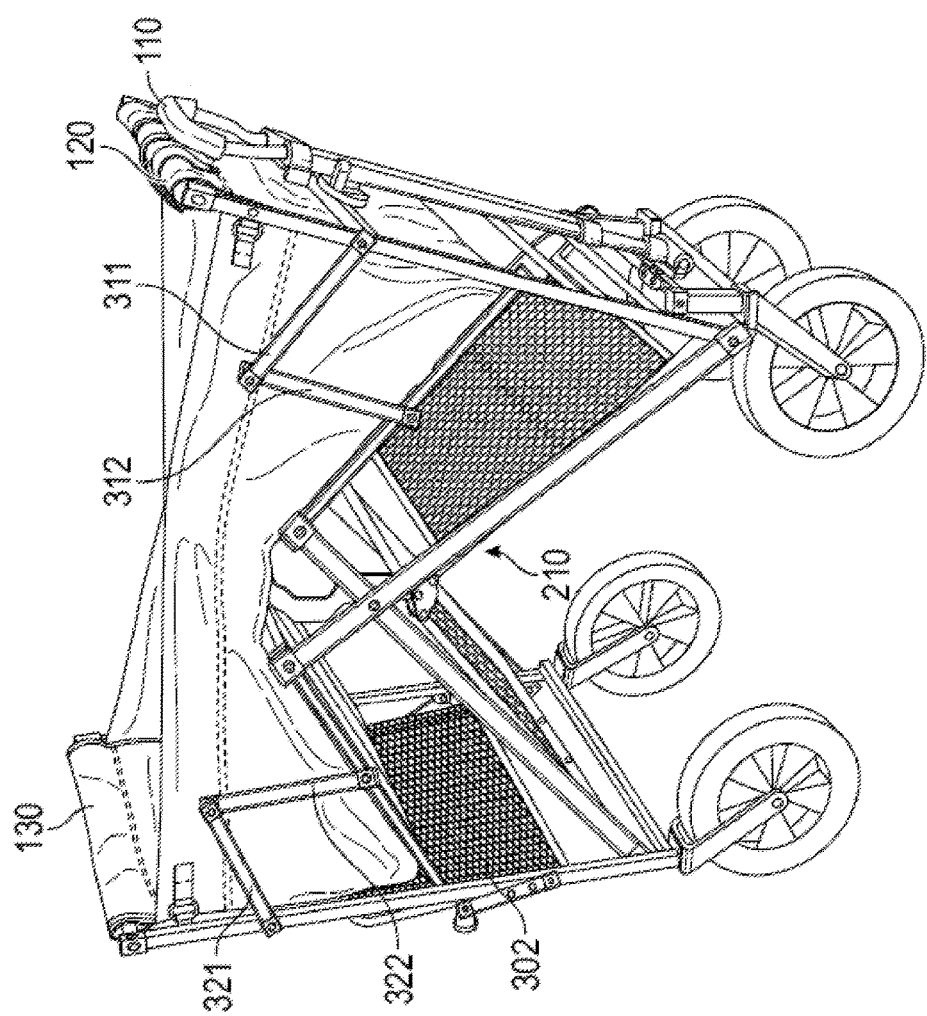
Figure 7E:
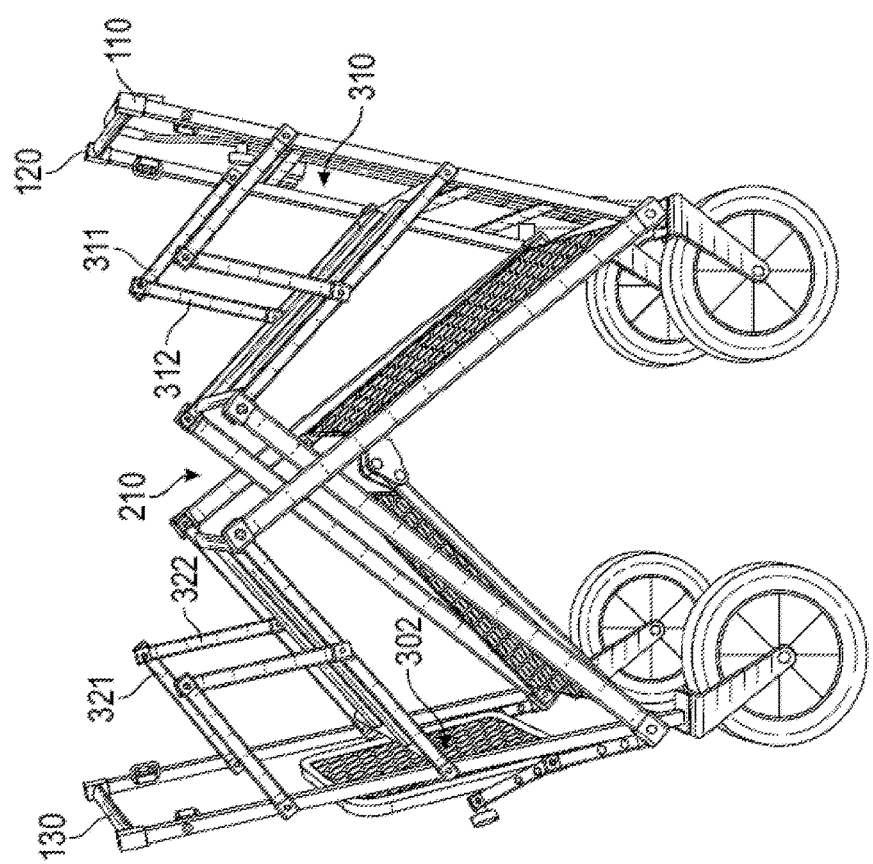
Figure 7F:
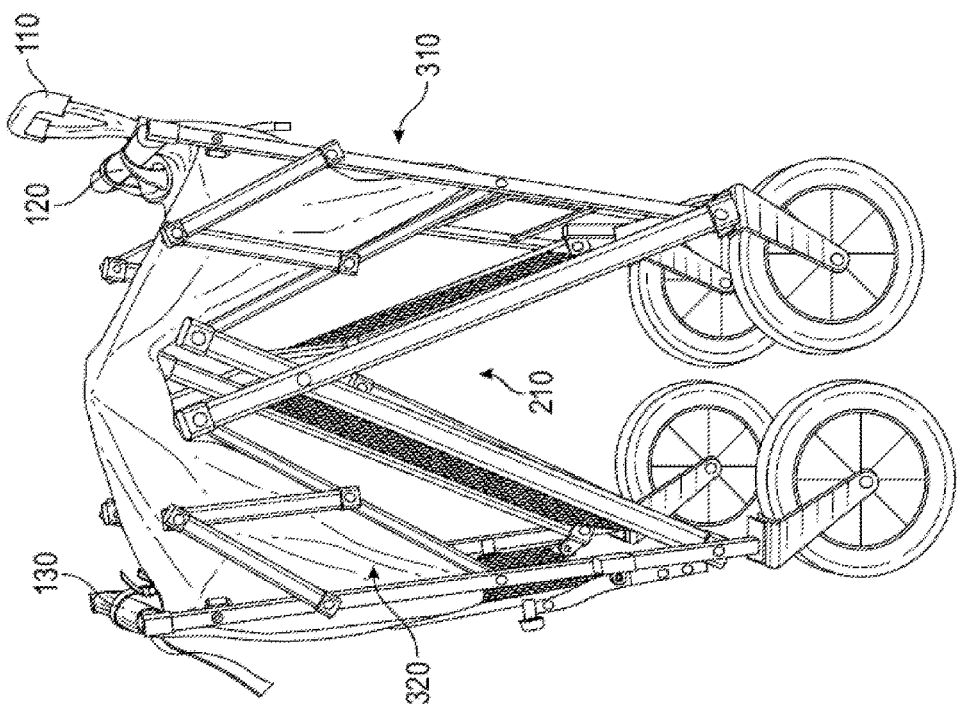
Figure 7H:
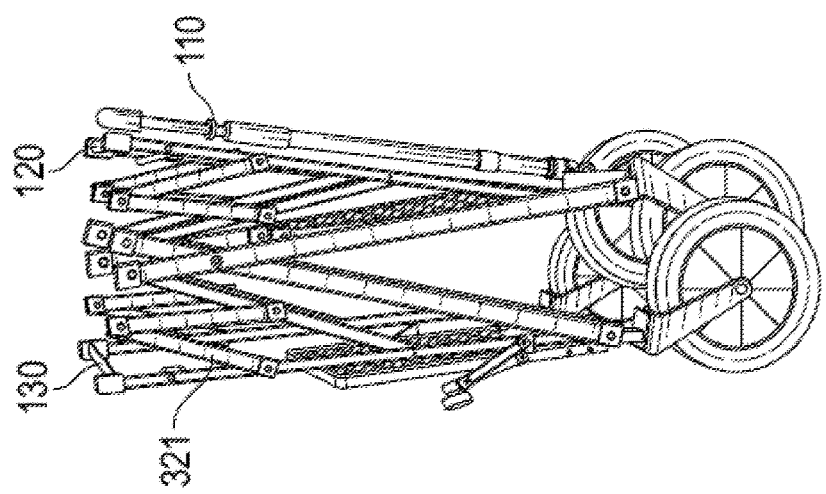
Figure 7G:
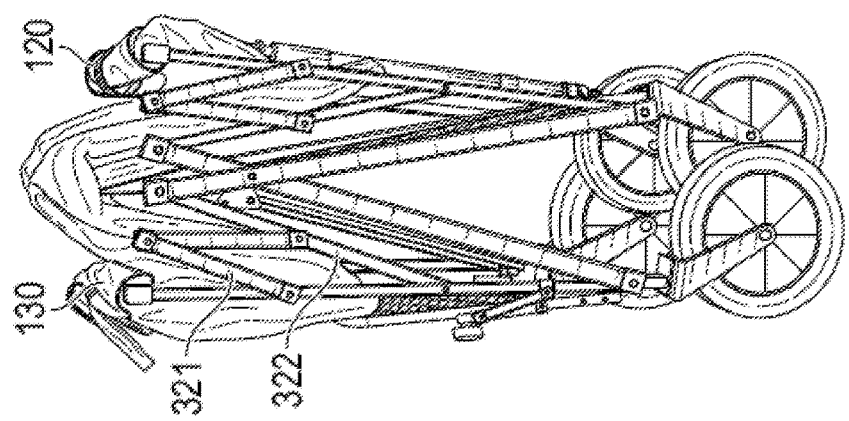

FIGS. 7A and 7B illustrate the fully extended configuration of the connecting members 210, thus providing the maximum space to retain the container 300 in the top space 502 to provide maximum storage capacity in the container 300, and in addition a flat platform 301 for additional storage space 501. As shown in FIGS. 7A and 7B, the extended platform 302 has been pivoted to fold upwards against the second supporting frame 130'A strap handle may be provided on the surface of the base of the container 300, which facilitate a user pulling on this handle to initiate the collapsing sequence, as shown in FIG. 7C. As the user pulls on the handle, the connection member 210 begin to collapse, with the supporting frames (120', 130') coming closer to each other, as shown in FIGS. 7D and 7E. By lightly pushing on the supporting frames (120', 130') to squeeze them further towards each other as shown in FIG. 7F, the wagon fully collapses into a compact configuration, with the connecting members 210 in a collapsed configuration, as shown in FIGS. 7G and 7H.

To open/extend the wagon from its collapsed configuration, the reverse of the sequence in FIGS. 7A to 7H is undertaken. The supporting frames (120', 130') are pulled apart to extend the connecting members 210. Further pushing down on the top of the base of container would facilitate extending of the connecting members 210, to reach the fully opened/extended configuration shown in FIGS. 7A and 7B.

Having described the invention by the description and illustrations above, it should be understood that these are exemplary of the invention and are not to be considered as limiting. Accordingly, the invention is not to be considered as limited by the foregoing description, but includes any equivalents.

What is claimed is:

1. A collapsible wagon, comprising:
   a first supporting frame;
   a second supporting frame; and
   a pair of collapsible connecting members pivotally connected to an upper portion and a lower portion of the respective first and second supporting frames,
   wherein the pair of connecting members is configured between an extended configuration in which the first and second supporting frames are spaced apart and a receiving space is defined between the first and second supporting frames and the pair of connecting members, and a collapsed configuration in which the first supporting frame moves towards the second supporting frame to collapse the receiving space, and
   wherein each connecting member comprises a single scissor hinge structure pivotally interconnecting between the first and second supporting frames.

2. The collapsible wagon as in claim 1,
   wherein the scissor hinge structure comprises a first connecting unit and a second connecting unit,
   wherein the first and second connecting units are pivotally connected at a substantially pivotal center of the scissor hinge structure,
   wherein a first end of the first connecting unit is pivotally connected to a lower portion of the first supporting frame, and a first end of the second connecting unit is pivotally connected to a lower portion of the second supporting frame, and
   wherein the pivotal center is located away from the mid-point along the respective first and second connecting units, and at a location further away from the pivotal connection to the lower portion of the respective first and second supporting frames.

3. The collapsible wagon as in claim 2, wherein each connecting member further comprises:
   a third connecting unit having a first end pivotally connected to an upper portion above the lower portion of the first supporting frame, and a second end pivotally connected to a second end of the second connecting unit above the pivotal center; and a fourth connecting unit having a first end pivotally connected to an upper portion above the lower portion of the second supporting frame, and a second end pivotally connected to a second end of the first connecting unit above the pivotal center.

4. The collapsible wagon as in claim 3, wherein the third connecting unit and the fourth connecting unit are substantially horizontal with the connecting member in the extended configuration.

5. The collapsible wagon as in claim 4, wherein a collapsible container made of a flexible material is provided in the receiving space in the extended configuration of the connecting members, and wherein the container is collapsed as the receiving space is collapsed in the collapsed configuration of the connecting members.

6. The collapsible wagon as in claim 4, further comprising a plurality of cross-members connecting between the connection members and above the receiving space.

7. The collapsible wagon as in claim 6, further comprising a first bracing member pivotally connected to the third connecting unit and the first supporting frame, and a second bracing member pivotally connected to the fourth connecting unit and the second supporting frame.

8. The collapsible wagon as in claim 7,
wherein the first bracing member comprises a fifth and sixth connecting units, wherein a first end of the fifth connecting unit is pivotally connected to the first end of the sixth connecting unit, and wherein a second end of the fifth connecting unit is pivotally connected to a top portion above the upper portion of the first supporting frame, and a second end of the sixth connecting unit is pivotally connected to along the third connecting unit, and wherein the second bracing member comprises a seventh and eighth connecting units, wherein a first end of the seventh connecting unit is pivotally connected to the first end of the eighth connecting unit, and wherein a second end of the seventh connecting unit is pivotally connected to a top portion above the upper portion of the first supporting frame, and a second end of the eighth connecting unit is pivotally connected to along the fourth connecting unit.

9. The collapsible wagon as in claim 8, wherein a top space is defined above the cross-members by the first and second bracing members and the first and second supporting frames in the extended configuration of the connecting members, wherein the top space is collapsed in the collapsed configuration of the connecting members.

10. The collapsible wagon as in claim 9, wherein a collapsible container made of a flexible material is provided in the top space above the cross-members and the receiving space in the extended configuration of the connecting members, and wherein the container is collapsed as the top space is collapsed in the collapsed configuration of the connecting members.

11. The collapsible wagon as in claim 10, further comprising a foldable platform below the receiving space, wherein the foldable platform is foldable along a hinge below the pivotal center of the connecting member.

12. The collapsible wagon as in claim 11, further comprising an extended platform pivotally supported at the lower portion of the second supporting frame.

13. The collapsible wagon as in claim 10, further comprising a flexible strap anchoring the bottom of the container to the foldable platform in the extended configuration of the connecting members.

* * * * *